Patented Feb. 27, 1945

2,370,586

UNITED STATES PATENT OFFICE 2,370,586

AMINODIOXANES

Murray Senkus, Terre Haute, Ind., assignor to Commercial Solvents Corporation, Terre Haute, Ind., a corporation of Maryland No Drawing. Application April 2, 1942,
Serial No. 437,359

9 Claims. (Cl. 260—338)

My invention relates to new and useful dioxanes, and more particularly to a new class of aminodioxanes having the following structural formula:

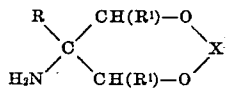

wherein R may be either hydrogen, alkyl, or alpha-hydroxyalkyl; $R^1$ may represent hydrogen, alkyl, aryl, or furyl; and X is cycloalkylidene, alkyl substituted cycloalkylidene, or

wherein $R^2$ and $R^3$ may be either alkyl, aryl, or aralkyl.

As examples of the aminodioxanes which may be included within the scope of my invention, are the 5-amino-2,2-pentamethylene-1,3-dioxanes, the 5-amino-2,2-dialkyl-1,3-dioxanes, the 5-amino-2-benzyl-2-methyl-1,3-dioxanes, and the 5-amino-2,2-diphenyl-1,3-dioxanes, which have respectively the following structural formulas:

1

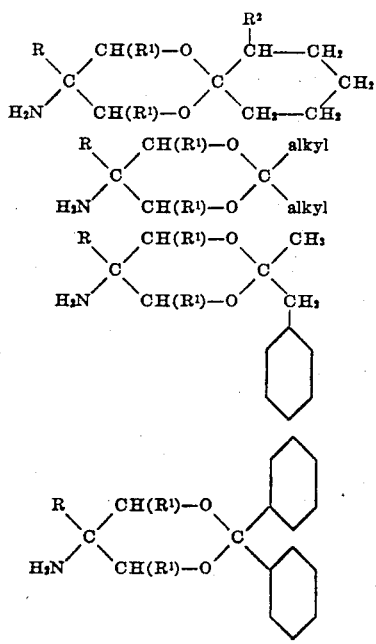

wherein R may represent hydrogen, alkyl, or alpha-hydroxy-alkyl, $R^1$ may be either hydrogen, alkyl, aryl, or furyl, and $R^2$ represents either hydrogen or alkyl.

The aminodioxanes of my invention may be prepared by any procedure which provides conditions favorable to ketal formation. I prefer, however to prepare these compounds by the catalytic reduction of the corresponding nitro dioxanes. According to this process the desired nitro dioxane is subjected to hydrogenation at normal or elevated pressures in the presence of a suitable nickel catalyst, with or without an auxiliary solvent, at a temperature below 125° C. In general, any hydrogenation catalyst which possesses catalytic activity under the conditions employed, will be satisfactory. I prefer, however, to use a finely-divided Raney nickel catalyst. This catalyst is very active in a hydrogenation process of this type, and has an exceptionally long life.

The hydrogenation reaction in general may be effected at hydrogen pressures ranging from atmospheric pressure to pressures slightly below those which tend to cleave the ketal linkage. I have found it preferable, however, to carry out such reactions at a pressure of approximately 2000 pounds per square inch and at a temperature of about 70° C. The rate of reaction is directly proportional to the temperatures and pressures utilized, and therefore, for a decrease in one of these factors, there should be a corresponding increase in the other. Lower temperatures and pressures will ordinarily require a longer reaction time and, conversely, higher pressures and temperatures will, in general, shorten the time for completion of the reaction. However, under the latter conditions excessive pressures and/or temperatures, even with short reaction periods, tend to result in lower yields of the desired amino compound. When carrying out the reaction in accordance with the preferred conditions described above, the hydrogenation in general is found to be complete after a period of from one to two hours. Optimum conditions in regard to the temperature, pressure, and catalyst, in any given instance, however, may be readily determined by simple experiment. Also, it is generally desirable to employ suitable solvents such as methanol or ethanol.

After the reaction is complete, as may be evidenced by the failure of additional hydrogen absorption, the catalyst is separated from the reaction mixture and the solvent, if employed, is distilled off, leaving the aminodioxane as a residue. The aminodioxanes, obtained in this manner are, in general, relatively pure products. The compounds which are solids at ordinary temperatures may be purified further, if desired, however, by recrystallization from common organic solvents, such as acetone, ether, benzene, and the like. The normally liquid aminodioxanes may be purified further by rectification at reduced pressure.

The nitrodioxanes employed in the preparation of these compounds, may be produced in accordance with any suitable procedure. However, I prefer to prepare such compounds in accordance with the process for the preparation of nitro ketals described in my co-pending application Serial No. 429,770, filed February 6, 1942. According to this process, approximately equivalent amounts of the polyhydroxy nitro compound and the desired ketone are refluxed in the presence of a small amount of organic acid catalyst, such as para-toluene-sulfonic acid, and, if desired, in the presence of an organic liquid such as benzene or toluene, thereby facilitating the removal of the water of reaction as a constant boiling mixture. I have found this reaction to be very general in character, and may be effected between any ketone and a polyhydroxy compound of the type disclosed below.

Suitable ketones which may be employed in the reaction are acetone, methyl ethyl ketone, methyl isobutyl ketone, methyl benzyl ketone, methyl phenyl ketone, cyclohexanone, 2-methylcyclohexanone, cyclopentanone, benzophenone, and the like. As examples of polyhydroxy nitro compounds which may be utilized, there may be mentioned tris(hydroxymethyl)nitromethane, 2-nitro-2-propyl-1,3-propanediol, 5-nitro-2,8-dimethyl-4,6-nonanediol, 2-nitro-1,3-diphenyl-1,3-propanediol, 2-nitro-1,3-difuryl-1,3-propanediol, and the like.

My invention may be further illustrated by the following specific examples:

*Example I*

Sixteen parts of 2,2-dimethyl-5-hydroxymethyl-5-nitro-1,3-dioxane was dissolved in 158 parts of methanol. This solution and 5 parts of Raney nickel catalyst were placed in a suitable hydrogenation apparatus and sealed. The solution was then hydrogenated at a pressure of 2000 pounds per square inch at 70° C. for a period of one hour with constant agitation. After absorption of hydrogen had ceased, the reaction mixture was withdrawn from the hydrogenation apparatus and filtered. The methanol was then separated from the reaction mixture by means of distillation at reduced pressure. The 5-amino-2,2-dimethyl-5-hydroxymethyl-1,3-dioxane thus obtained amounted to 12 parts, corresponding to a 90 per cent yield, after recrystallization from ether. The crystalline product obtained in this manner melted at 55° C. (uncorrected).

*Example II*

5-Amino-2-benzyl-5-hydroxymethyl-2-methyl-1,3-dioxane was prepared by dissolving 45 parts of 5-nitro-2-methyl-2-benzyl-5-hydroxymethyl-1,3-dioxane in 277 parts of methanol. This solution was then hydrogenated under conditions similar to those described in Example I in the presence of 5 parts of nickel catalyst. The corresponding amino compound was obtained in a 70 per cent yield and melted at 114.5° C. (uncorrected) after two recrystallizations from ether.

*Example III*

5-Amino-5-methyl-2,2-pentamethylene-1,3-dioxane was prepared by dissolving 80 parts of 5-nitro-5-nitro-5-methyl-2,2-pentamethylene-1,3-dioxane in 400 parts of methanol and hydrogenating under conditions similar to those described in Example I at 1700 pounds pressure for one hour. The methanol solution was then filtered, and the filtrate rectified. The corresponding amino compound thus obtained amounted to a yield of 78 per cent, and was found to have a boiling point of 95° C. at 3 mm. pressure.

The aminodioxanes of the present invention are relatively stable compounds and the majority thereof are, in general, soluble in water, methanol, benzene, and ether. The following data were determined for certain of the aminodioxanes prepared as described above:

| Compound | Conversion, per cent | Melting point, ° C. (uncorrected) | Boiling point, ° C. (uncorrected) | Nitrogen analysis | | Neutral equiv. | | Soluble in ether |
|---|---|---|---|---|---|---|---|---|
| | | | | Calc. | Found | Calc. | Found | |
| 5-amino-2,2-dimethyl-5-hydroxymethyl-1,3-dioxane | 90 | 55 | | 8.69 | 8.52 | 161 | 162 | Yes. |
| 5-amino-2,5-diethyl-2-methyl-1,3-dioxane | 80 | | 96 at 15 mm | 8.10 | 8.34 | 173 | 174 | Yes. |
| 5-amino-2-isobutyl-5-ethyl-2-methyl-1,3-dioxane | 83 | | 114 at 14 mm | 6.96 | 6.84 | 201 | 203 | Yes. |
| 5-amino-2-benzyl-5-hydroxymethyl-2-methyl-1,3-dioxane | 70 | 114.5 | | 5.91 | 5.89 | 237 | 238 | Yes. |
| 5-amino-5-hydroxymethyl-2-methyl-2-phenyl-1,3-dioxane | 91 | 163 | | 6.78 | 6.42 | 223 | 224 | Yes. |
| 5-amino-2,2-diphenyl-5-methyl-1,3-dioxane | 78 | 154.5 | | 5.20 | 5.25 | 269 | 269 | Yes. |
| 5-amino-5-methyl-2,2-pentamethylene-1,3-dioxane | 78 | | 95 at 3 mm | 7.57 | 7.64 | 185 | 185 | Yes. |
| 5-amino-5-ethyl-2,2-(1-methylpentamethylene)1,3-dioxane | 90 | | 128 at 9 mm | 6.57 | 6.70 | 213 | 212 | Yes. |
| 5-amino-5-methyl-2,2-tetramethylene-1,3-dioxane | 91 | | 76 at 2 mm | 8.18 | 8.01 | 171 | 171 | Yes. |

Since the number of preparations of each of these compounds was limited, it is to be understood that, while the above properties given will be useful in identifying the compounds of my invention, I do not desire to be restricted to products having the exact properties listed.

The aminodioxanes of my invention, particularly those prepared from the cyclic ketones, have been found to be useful in the preparation of wetting agents possessing special properties. They are likewise useful as intermediates in the preparation of numerous organic compounds. Other uses of these products will readily occur to those skilled in the art.

My invention now having been described, what I claim is:

1. Aminodioxanes having the structural formula:

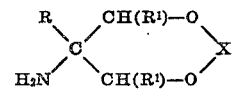

wherein R is a member of the class consisting of hydrogen, alkyl, and alpha-hydroxy alkyl; $R^1$ is a member of the class consisting of hydrogen, alkyl, aryl, and furyl; and X is a member of the group consisting of monocycloalkylidene, alkyl substituted monocycloalkylidene, and

wherein $R^2$ and $R^3$ represent members of the group consisting of alkyl, aryl, or aralkyl.

2. Aminodioxanes having the structural formula:

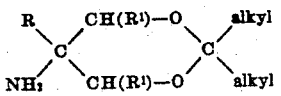

wherein R is a member of the class consisting of hydrogen, alkyl, and alpha-hydroxyalkyl, and $R^1$ is a member of the class consisting of hydrogen, alkyl, aryl, and furyl.

3. Aminodioxanes having the structural formula:

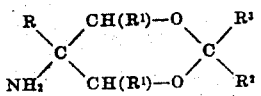

wherein R is a member of the class consisting of hydrogen, alkyl, and alpha-hydroxyalkyl; $R^1$ is a member of the class consisting of hydrogen, alkyl, aryl, and furyl; $R^2$ is a member of the group consisting of alkyl, aryl, aralkyl, and $R^3$ is a member of the group consisting of alkyl, aryl, and aralkyl.

4. Aminodioxanes having the structural formula:

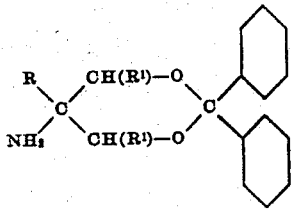

wherein R is a member of the class consisting of hydrogen, alkyl, and alpha-hydroxyalkyl, and $R^1$ is a member of the class consisting of hydrogen, alkyl, and furyl.

5. Aminodioxanes having the structural formula:

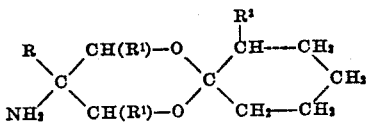

wherein R is a member of the class consisting of hydrogen, alkyl, and alpha-hydroxy alkyl; $R^1$ is a member of the class consisting of hydrogen, alkyl, aryl, and furyl, and $R^2$ represents a member selected from the group consisting of hydrogen and alkyl.

6. 5-amino-2,2-diphenyl-5-methyl-1,3-dioxane.
7. 5 - amino - 5 - hydroxymethyl - 2-methyl-2-phenyl-1,3-dioxane.
8. 5 - amino-5-methyl-2,2-pentamethylene-1,3-dioxane.
9. In a process for the direct hydrogenation of 5-nitro-1,3-dioxanes to 5-amino-1,3-dioxanes having the structural formula:

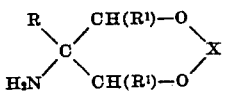

wherein R is a member of the class consisting of hydrogen, alkyl, and alpha-hydroxy alkyl; $R^1$ is a member of the class consisting of hydrogen, alkyl, aryl, and furyl; and X is a member of the group consisting of monocycloalkylidene, alkyl substituted monocycloalkylidene, and

wherein $R^2$ and $R^3$ represent members of the group consisting of alkyl, aryl, or aralkyl, the step which comprises subjecting a 5-nitro-1,3-dioxane to hydrogenation in the liquid phase in the presence of a hydrogenation catalyst at a temperature not substantially in excess of 70° C.

MURRAY SENKUS.